Sept. 19, 1961   W. H. DAVIS, JR., ET AL   3,001,070
METHOD OF GAGING FILLING HEIGHTS IN CLOSED CONTAINERS
Filed Feb. 9, 1956
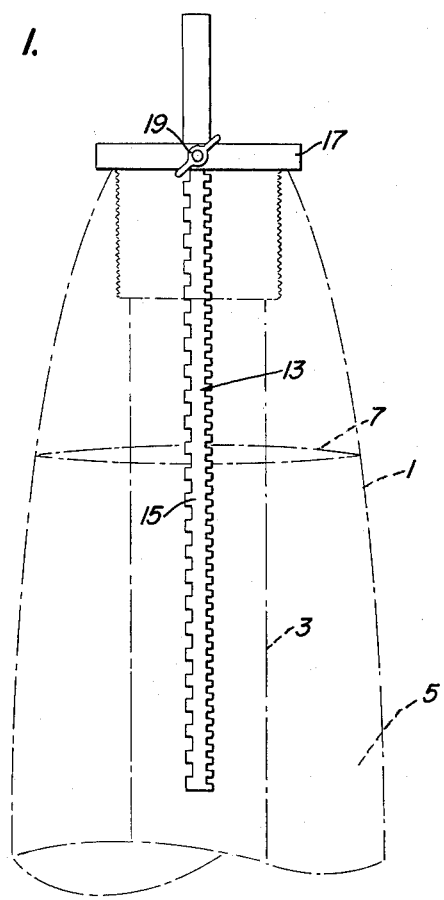
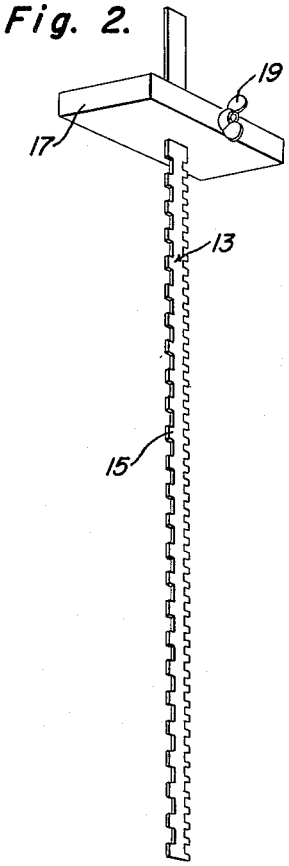
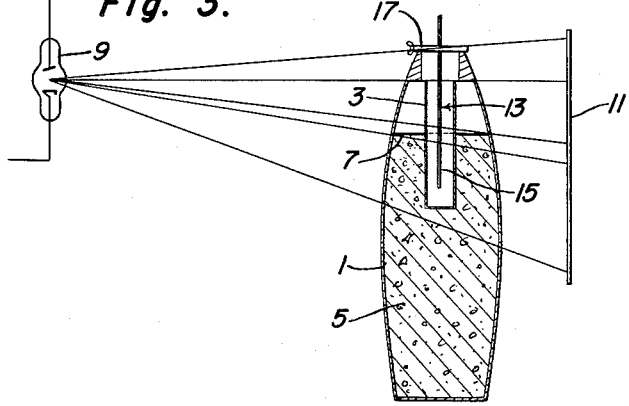
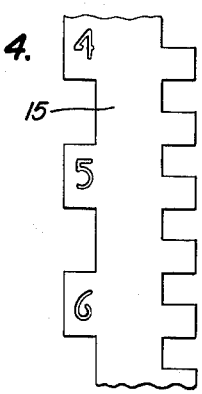
INVENTORS.
Pasquale R. Proto
William H. Davis, Jr.
Harry J. DeMull
BY George Renehan
ATTORNEY

United States Patent Office 3,001,070
Patented Sept. 19, 1961

---

3,001,070
METHOD OF GAGING FILLING HEIGHTS IN CLOSED CONTAINERS
William H. Davis, Jr., Edgewood, Harry J. De Mull, Havre de Grace, and Pasquale R. Proto, Bel Air, Md., assignors to the United States of America as represented by the Secretary of the Army
Filed Feb. 9, 1956, Ser. No. 564,591
4 Claims. (Cl. 250—67)
(Granted under Title 35, U.S. Code (1952), sec. 266)

The invention described herein may be manufactured and used by or for the Government of the United States of America without payment to us of any royalty thereon.

This invention relates to a method of measuring the height of fill in containers in which the filling is not accessible for direct measurement, particularly munitions which have been filled and closed.

In the drawings, FIG. 1 is an elevation of a gage employed in our method positioned in a munition. FIG. 2 is a perspective view of a gage. FIG. 3 is a diagrammatic view showing the distortion produced by radiography. FIG. 4 is a detail view of a gage.

Chemical munitions, such as chemical shells, bombs, and missile warheads commonly comprise an outer casing 1, a central burster well 3 which receives a high explosive burster charge, and a chemical filling 5 between the casing and the burster well. As a part of the manufacturing process, it is necessary to determine the height of the surface 7 of the charge 5 after the munition has been filled and closed, at which time the surface 7 is not accessible for direct measurement.

By means of radiography it is possible to determine the position of the surface 7. The accurate measurement of its height, however, involves difficulties due to distortion. The basis for this distortion is apparent from FIG. 3, wherein 9 represents the X-ray tube and 11 the X-ray film. As indicated, X-rays emanate essentially from a point source so that distances between points on film 11 do not correspond to the actual vertical distance the points radiographed. Moreover, the difference is not constant but varies along the film. The greater the vertical distance of a point from the source of X-rays, the greater the distortion of its position on film 11. In actual practice, we have found that when the distances are measured directly on the film the errors due to distortion are frequently of the same order of magnitude as the tolerances allowed in filling. Hence these errors may easily result in the improper acceptance or rejection of a given lot.

We have solved the problem by employing a gage 13 having indicia which will be visible on an X-ray negative. The gage is inserted in the burster well and radiographed together with the munition. The height of surface 7 can then be read directly from the indicia on the gage.

While the gage may be of various forms, we have successfully employed that shown in the drawings which comprises an evenly notched bar 15 having a head 17 adjustably secured thereto by set screw 19. For convenience in reading we prefer to employ notches on both edges, those on one edge being an even multiple, say twice, the length of those on the other edge. As a further aid in reading, numerals may be cut or punched through the bar as shown in FIG. 4.

It will be apparent that various changes can be made. We therefore wish our invention to be limited solely by the scope of the appended claims.

We claim:

1. A method of measuring the height of fill in a container wherein the filling is not accessible for direct measurement comprising positioning within said container a gage having indicia visible on an X-ray negative and radiographing said receptacle and gage.

2. A method of measuring the height of fill of a filled and closed munition comprising an outer casing, a central longitudinal burster well and a filling between said casing and said burster well, said method comprising positioning within said burster well a gage having indicia visible on an X-ray negative and radiographing said munition and gage.

3. A method as defined in claim 1 wherein said gage is a notched metal rod.

4. A method as defined in claim 2 wherein said gage is a notched metal rod.

References Cited in the file of this patent

UNITED STATES PATENTS

| | | |
|---|---|---|
| 2,497,445 | Gaul | Feb. 14, 1950 |
| 2,630,534 | Heinecke et al. | Mar. 3, 1953 |
| 2,641,034 | Harter | June 9, 1953 |
| 2,763,789 | Ohmart | Sept. 18, 1956 |